United States Patent [19]

Hergenrother et al.

[11] Patent Number: 5,270,432

[45] Date of Patent: Dec. 14, 1993

[54] POLYBENZOXAZOLE VIA AROMATIC NUCLEOPHILIC DISPLACEMENT

[75] Inventors: Paul M. Hergenrother; John W. Connell, both of Yorktown; Joseph G. Smith, Jr., Hampton, all of Va.

[73] Assignee: The United States of America as represented by the Administrator of the National Aeronautics and Space Administration, Washington, D.C.

[21] Appl. No.: 867,864

[22] Filed: Apr. 10, 1992

[51] Int. Cl.$^5$ .............................................. C08G 73/08
[52] U.S. Cl. .................................. 528/128; 528/125; 528/126; 528/167; 528/171; 528/172; 528/174; 528/210
[58] Field of Search .............. 528/128, 210, 125, 126, 528/167, 171, 172, 174

[56] References Cited

U.S. PATENT DOCUMENTS 5,091,500  2/1992  Lysenko et al. .................... 528/128

Primary Examiner—Harold D. Anderson
Attorney, Agent, or Firm—George F. Helfrich

[57] ABSTRACT

Polybenzoxazoles (PBO) are prepared by the aromatic nucleophilic displacement reaction of novel di(hydroxyphenyl)benzoxazole monomers with activated aromatic dihalides or activated aromatic dinitro compounds. The polymerizations are carried out in polar aprotic solvents, such as N-methylpyrrolidine or N,N-dimethylacetamide, using alkali metal bases, such as potassium carbonate, at elevated temperatures under nitrogen. The novel di(hydroxyphenyl)benzoxazole monomers are synthesized by reacting phenyl-4-hydroxybenzoate with aromatic bis(o-aminophenol)s in the melt. High molecular weight PBO of new chemical structures are prepared that exhibit a favorable combination of physical and mechanical properties. The use of the novel di(hydroxyphenyl)benzoxazoles permits a more economical and easier way to prepare PBO than previous routes.

3 Claims, No Drawings

POLYBENZOXAZOLE VIA AROMATIC NUCLEOPHILIC DISPLACEMENT

ORIGIN OF THE INVENTION

The invention described herein was jointly made in the performance of work under a NASA contract and by employees of the United States Government. In accordance with 35 U.S.C. 202, the contractor elected not to retain title.

BACKGROUND OF THE INVENTION

1. Field of the Invention

This invention relates generally to heterocyclic macromolecules. It relates particularly to polybenzoxazoles by the nucleophilic displacement reaction of di(hydroxyphenyl) benzoxazole monomers with activated aromatic dihalides.

2. Description of the Related Art

Polybenzoxazoles (PBO) are heterocyclic macromolecules which were first synthesized in a two-step process by the initial formation of soluble poly(o-hydroxy)amide)s through solution condensation of aromatic diacid chlorides with bis(o-aminophenol)s followed by thermal cyclodehydration [T. Kubota and R. Nakanishi, *J. Polym. Sci., Part B*, 2, 655 (1964)]. Since then several methods have been utilized in their synthesis. The most common synthetic method for PBO involves a polycondensation of bis(o-aminophenol)s with aromatic diacid diphenyl esters [W. M. Moyer, Jr., C. Cole, and T. Anyos, *J. Polym. Sci., Part A*, 3, 2107 (1965)]. Another preparative route involves the solution polycondensation of the hydrochloride salts of bis(o-amino phenol)s with aromatic diacids in polyphosphoric acid [Y. Imai, I. Taoka, K. Uno, and Y. Iwakura, *Makromol Chem.*, 83, 167 (1965)]. Another synthetic method involves the initial formation of poly(o-hydroxy amide)s from silylated bis(o-aminophenol)s with aromatic diacid chlorides followed by thermal cyclodehydration to PBO [Y. Maruyama, Y. Oishi, M. Kakimoto, and Y. Imai, *Macromolecules*, 21 (8), 2221 (1988)]. A recent preparative route involves the reaction of aromatic bisphenols with bis(fluorophenyl) benzoxazoles by the nucleophilic displacement reaction to form PBO [J. G. Hilborn, J. W. Labadie, and J. L. Hedrick, *Macromolecules*, 23, 2854 (1990)].

Primary objects of the present invention are to provide new polybenzoxazoles (PBO), a new process for preparing PBO, and new monomers used for the preparation of PBO. Another object is to provide new PBO that are useful as adhesives, coatings, films, membranes, moldings, and composite matrices.

SUMMARY OF THE INVENTION

According to the present invention, the foregoing and additional objects are obtained by synthesizing PBO by the nucleophilic displacement reaction of di(-hydroxyphenyl) benzoxazole monomers with activated aromatic dihalides. The inherent viscosities ($\eta_{inh}$) of the PBO range from 0.25 to 1.04 dL/g and the glass transition temperatures ($T_g$) range from 214°–285° C. Several of the polymers exhibit crystalline melting temperatures ($T_m$) by differential scanning calorimetry (DSC) with the $T_m$s ranging from 373°–446° C. Thermogravimetric analysis (TGA) at a heating rate of 2.5° C./min shows no weight loss occurring below 300° C. in air or nitrogen with a five percent weight loss occurring at about 485° C. in air, and at about 500° C. in nitrogen.

The instant synthesis of the PBO involves the use of di(hydroxyphenyl) benzoxazoles. The monomers are prepared from phenyl-4-hydroxybenzoate and aromatic bis(o-aminophenol)s as shown in Equation 1 below. The catenation of the hydroxy groups may be meta-meta, para-para, or para-meta.

The general reaction sequence for the synthesis of PBO is represented in Equation 2 below.

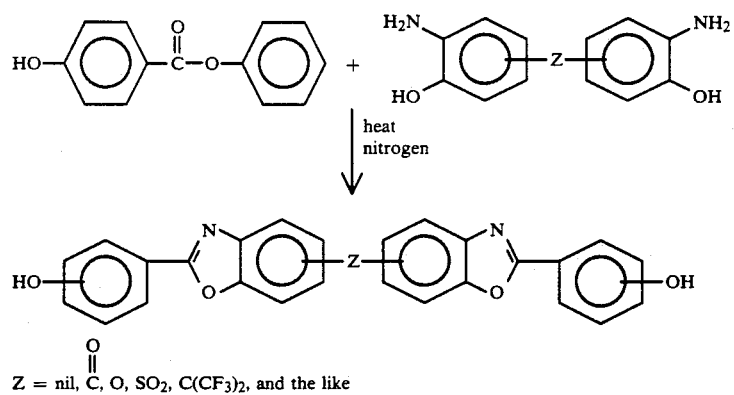

EQUATION 1

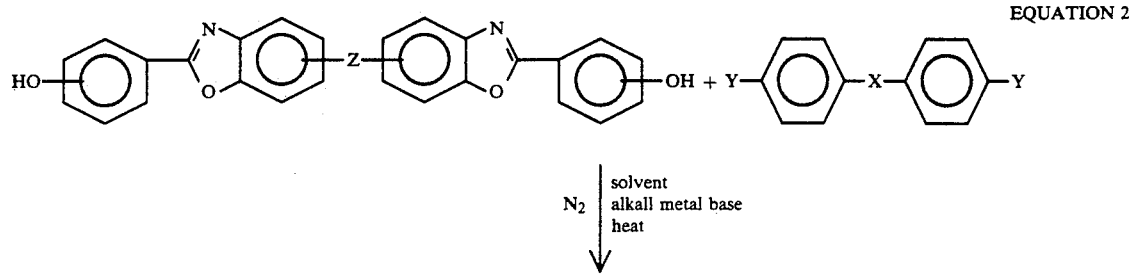

EQUATION 2

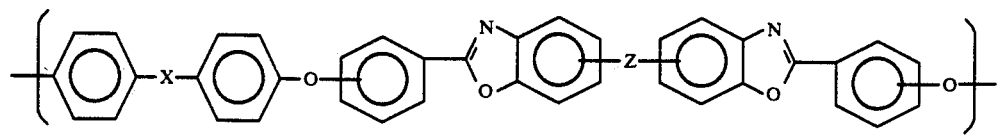

$Z$ = nil, $\overset{O}{\underset{\|}{C}}$, O, $SO_2$, $C(CF_3)_2$, and the like $X$ = 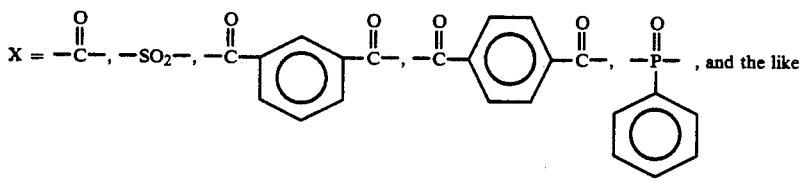, and the like

DESCRIPTION OF THE PREFERRED EMBODIMENTS

The present invention is in one aspect a poly(benzoxazole) having repeating units of the following general structural formula, wherein the catenation of oxygen is selected from the group consisting of meta-meta, para-para, and para-meta:

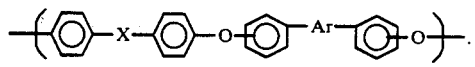

Ar is a radical selected from the group consisting of

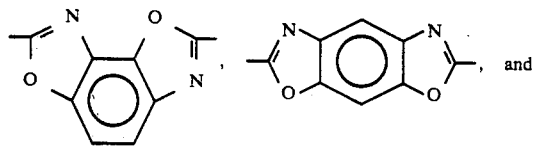

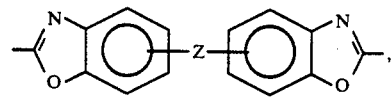

wherein Z is selected from the group consisting of

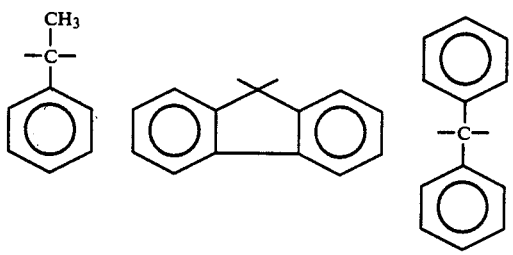

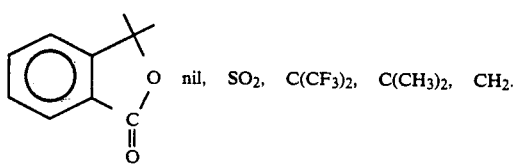 nil, $SO_2$, $C(CF_3)_2$, $C(CH_3)_2$, $CH_2$.

X is a radical elected from the group consisting of:

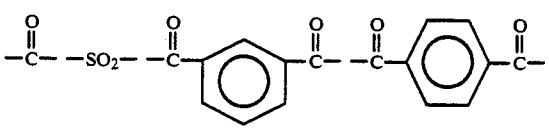

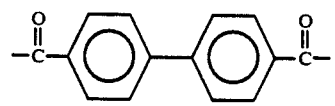

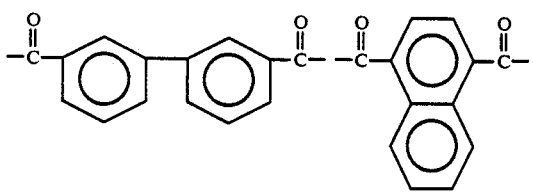

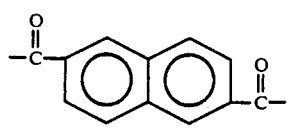

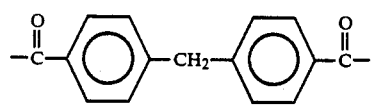

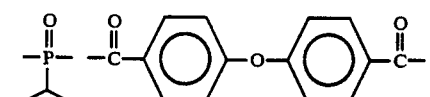

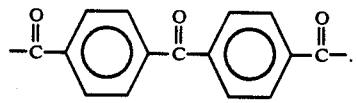

The number of repeating units in the poly(benoxazole)s according to the present invention is advantageously between 4 and 100.

Especially advantageous results are obtained if the poly(benzoxazole) according to the present invention has the general structural formula set forth above, wherein Ar is a radical represented by

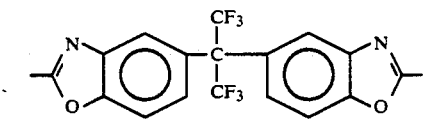

and X is selected from the group consisting of

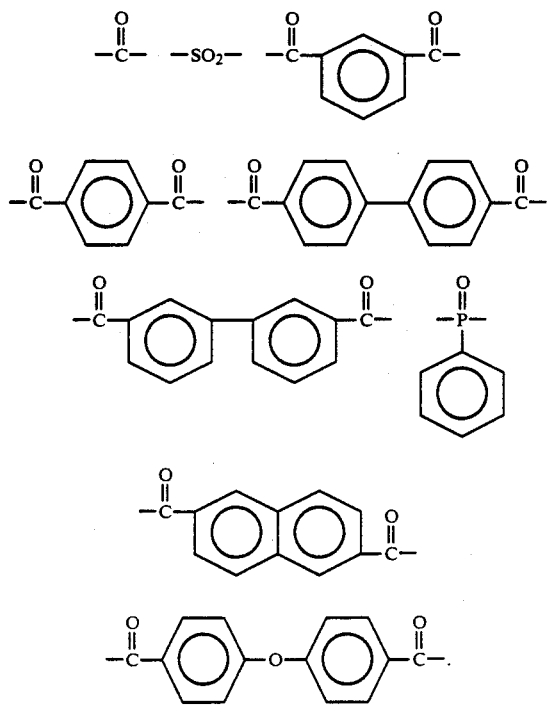

Equally advantageous results are obtained if the poly(benzoxazole) according to the present invention has the general structural formula set forth above, wherein Ar is a radical represented by

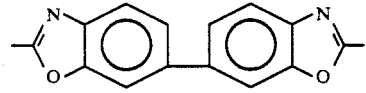

and X is selected from the group consisting of

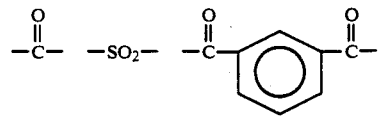

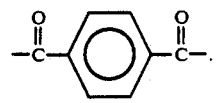

The present invention in another aspect is a di(hydroxyphenyl) benzoxazole having the general structure

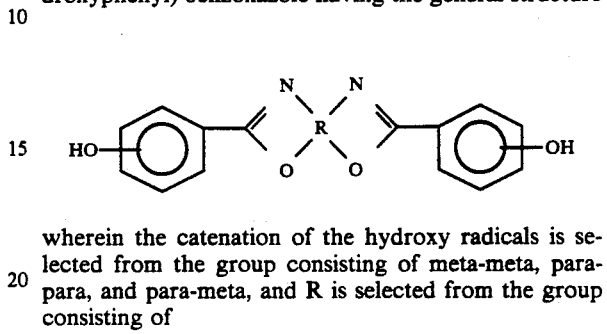

wherein the catenation of the hydroxy radicals is selected from the group consisting of meta-meta, para-para, and para-meta, and R is selected from the group consisting of

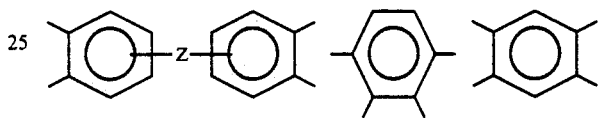

and Z is a radical selected from the group consisting of

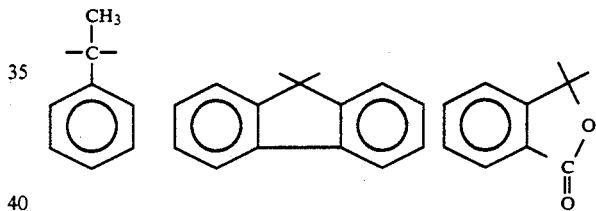

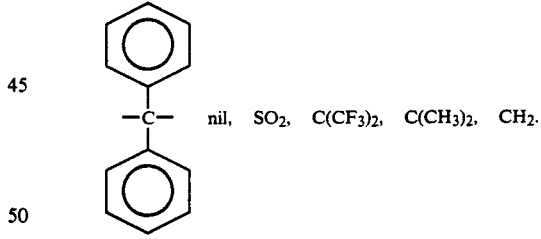  nil, $SO_2$, $C(CF_3)_2$, $C(CH_3)_2$, $CH_2$.

Especially good results are obtained if the di(hydroxyphenyl) benzoxazole is either

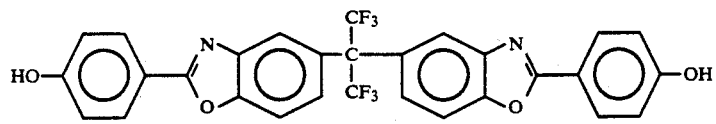

or

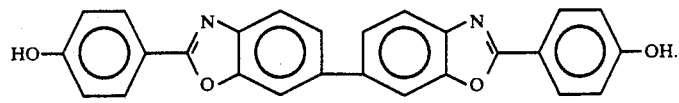

In yet another aspect, the present invention relates to a process for synthesizing poly(benzoxazole)s by aromatic nucleophilic displacement by reacting a di(hydroxyphenyl) benzoxazole with an activated aromatic dihalide or aromatic dinitro compound having the general structure

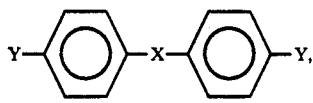

wherein X is a radical selected from the group consisting of

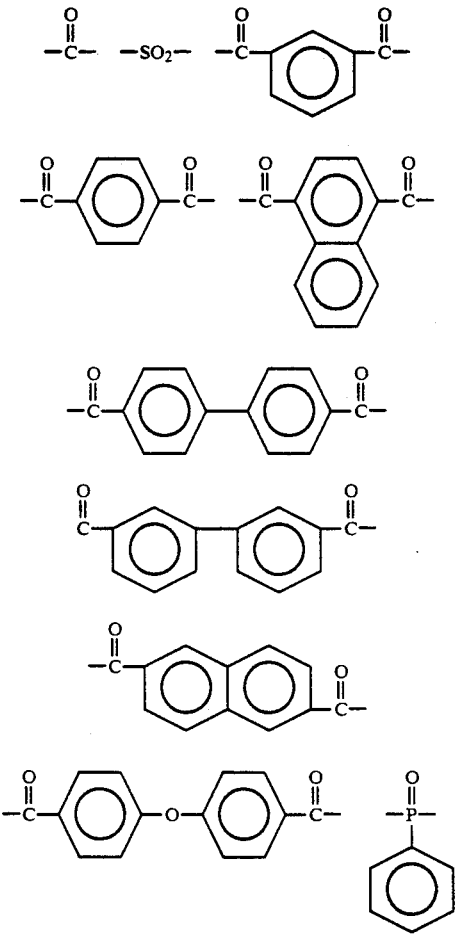

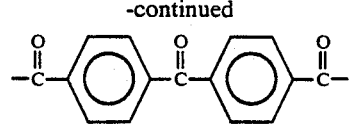

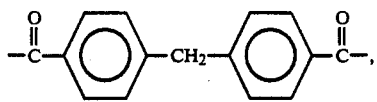

wherein Y is selected from the group consisting of Cl, F, and NO$_2$. The reaction is carried out in a polar aprotic solvent selected from the group consisting of N,N-dimethylacetamide, N-methylpyrrolidone, sulfolane, diphenylsulfone, N-cyclohexylpyrrolidone, and dimethylsulfoxide. The reaction takes place in the presence of an alkali metal base selected from the group consisting of potassium carbonate, sodium carbonate, potassium hydroxide, and sodium hydroxide. Moreover, the reaction is carried out with the application of heat.

Especially good results are obtained from the process according to the present invention if X is one of

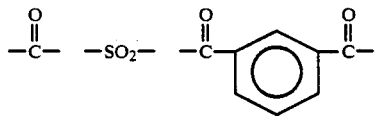

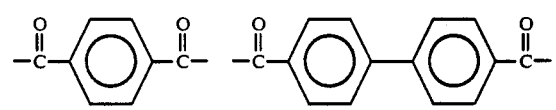

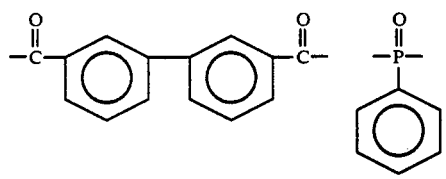

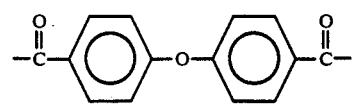

and the di(hydroxyphenyl)benzoxazole is one of

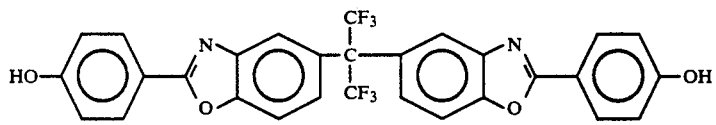

and

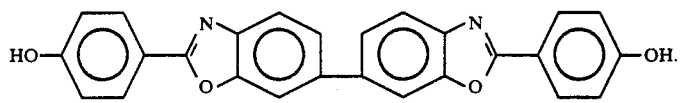

Moreover, the best results are achieved when Y is either Cl or F, especially F, and the polar aprotic solvent is either N,N-dimethylacetamide or diphenylsulfone.

Having thus described the invention, a more complete understanding thereof can be obtained by reference to the following Examples, which are provided for purposes of illustration.

EXAMPLE I

This Example illustrates the reaction sequence in Equation 1 above for the preparation of monomers.

A. 5,5'-Hexafluoroisopropylidene bis[2-(4-hydroxyphenyl)-benzoxazole]

A mixture of phenyl-4-hydroxybenzoate (51.03 g, 0.238 mol) and 2,2-bis(3-amino-4-hydroxyphenyl) hexafluoropropane (43.02 g, 0.117 mol) was slowly heated to 290° C. and maintained at approximately 290° C. for five hours under nitrogen. During this time, water and phenol were evolved and removed. The mixture was cooled to room temperature, and the resulting solid was dissolved in ethanol and poured into water to afford 64.1 g (96% yield) of a yellow powder, m.p. (differential thermal analysis (DTA), heating rate 10° C./min)) 305° C. (onset) to 310° C. (peak). The powder was vacuum sublimed at 320°-340° C. to afford a 79% yield of a yellowish-green crystalline solid, m.p. (DTA, heating rate 10° C./min)) 311°-313° C. Anal. calcd. for $C_{29}H_{16}N_2O_4F_6$: C, 61.06%; H, 2.83%; N, 4.91%; F, 19.98%; Found; C, 61.17%; H, 3.01%; N, 4.86%; F, 19.99%.

B. 6,6'-Bis[2-(4-hydroxyphenyl)benzoxazole]

A mixture of 3,3'-dihydroxybenzidine (15.7 g, 0.073 mol), phenyl-4-hydroxybenzoate (31.2 g, 0.146 mol) and phenylsulfone (50 g) was heated under nitrogen to 250° C. and stirred at 250°-260° C. for two hours. The cooled brown reaction mixture was subsequently boiled in methanol (400 ml), filtered, and the solid was air dried. The resulting tan solid (52.2 g) was extracted with boiling ethanol (500 ml) to yield an insoluble tan solid (22 g, 72% crude yield). This solid was recrystallized twice from a mixture of N,N-dimethylacetamide (200 ml) and ethanol (300 ml) using charcoal to afford tan crystals (14.4 g, 47% yield). (DTA, sharp endothermic peak at 393° C.). Anal. calcd. for $C_{26}H_{16}N_2O_4$: C, 74.28%; H, 3.84%; N, 6.66%. Found: C, 74.82%; H, 3.86%; N, 6.68%.

EXAMPLE II

This Example illustrates the reaction sequence in Equation 2 above for the preparation of PBO where X is equal to a carbonyl group, Y is F, and Z is 5,5'-hexafluoroisopropylidene.

Into a 100 ml three-necked round bottom flask equipped with a mechanical stirrer, thermometer, nitrogen inlet, and Dean Stark trap was placed 5,5-hexafluoroisopropylidene-bis[2-(4-hydroxyphenyl)benzoxazole] (3.5738 g, 0.0063 mol), 4,4'-difluorobenzophenone (1.3670 g, 0.0063 mol), pulverized anhydrous potassium carbonate (2.3098 g, 0.0167 mol, 30% excess), dry DMAc (29 ml, 18% solids), and toluene (55 ml). The mixture was heated to 130°-140° C. for four hours and then heated to 150°-160° C. overnight under nitrogen. The viscous brown solution was diluted with DMAc (20 ml) and precipitated in a water/acetic acid mixture, collected, washed successively in water and methanol, and dried at 120° C. to provide a cream colored polymer (4.44 g, 95% yield) with a $T_g$ of 254° C. The inherent viscosity of a 0.5% solution in NMP at 25° C. was 0.66 dL/g. Thin films cast from NMP gave tensile strength, tensile modulus, and elongation at 25° C. of 13.0 ksi, 317 ksi, and 10.9% and at 150° C. of 5.7 ksi, 232 ksi, and >15%, respectively.

EXAMPLE III

This Example illustrates the reaction sequence in Equation 2, for the preparation of PBO where X is equal to a 4,4'-dicarbonylbiphenyl group, Y is F, and Z is 5,5'-hexafluoroisopropylidene.

Into a 100 ml three-necked round bottom flask equipped with a mechanical stirrer, thermometer, nitrogen inlet, and Dean Stark trap was placed 5,5'-hexafluoroisopropylidene-bis[2-(4-hydroxyphenyl)benzoxazole] (2.8963 g, 0.0051 mol), 4,4'-bis(4-fluorobenzoyl)-biphenyl (2.0229 g, 0.0051 mol), pulverized anhydrous potassium carbonate (2.2672 g, 0.0164 mol, 30% excess), dry DMAc (29 ml, 18% solids), and toluene (55 ml). The mixture was heated to 130°-140° C. for four hours and then heated to 150°-160° C. overnight under nitrogen. The viscous brown solution was diluted with DMAc (20 ml) and precipitated in a water/acetic acid mixture, collected, washed successively in water and methanol, and dried at 120° C. to provide a cream colored polymer (4.61 g, 98% yield) with a $T_g$ of 257° C. The inherent viscosity of a 0.5% solution in NMP at 25° C. was 0.72 dL/g. Thin films cast from NMP gave tensile strength, tensile modulus, and elongation at 25° C. of 13.2 ksi, 268 ksi, and >15% and at 150° C. of 6.2 ksi, 217 ksi, and >15%, respectively.

EXAMPLE IV

This Example illustrates the reaction sequence for the preparation of PBO as shown in Equation 2, where Z is 6,6'-nil, X is an isophthaloyl group and Y is F.

Into a 100 ml three-necked round bottom flask equipped with a mechanical stirrer, thermometer, nitrogen inlet, and Dean Stark trap was placed 6,6'-bis[2-(4-hydroxyphenyl)benzoxazole] (2.3714 g, 0.0056 mol), 1,3-bis(4-fluorobenzoyl)benzene (1.8180 g, 0.0056 mol), pulverized anhydrous potassium carbonate (2.0378 g, 0.0147 mol, 30% excess), diphenylsulfone (16.99 g, 19% solids) and toluene (65 ml). The mixture was heated to 140°-150° C. for four hours and then was heated to 180° C. (one hour), 230° C. (two hours), and 260° C. (one and one-half hours) under nitrogen. The melt was cooled to 200° C., diluted with NMP (20 ml), and precipitated into an acetone/acetic acid mixture. The solid was collected, washed successively in water and methanol and dried at 125° C. to yield a yellow polymer (3.80 g, 96% yield) which showed a $T_m$ of 373° C., and after quenching a $T_g$ of 215° C. The inherent viscosity of a 0.5% solution in concentrated sulfuric acid was 1.04 dL/g.

EXAMPLE V

This example illustrates the reaction sequence for the preparation for the polybenzoxazole as shown in Equation 2, where Z is 6,6'-nil, X is a terephthaloyl group and Y is F.

Into a 100 ml three-necked round bottom flask equipped with a mechanical stirrer, thermometer, nitrogen inlet, and Dean Stark trap was placed 6,6'-bis[2-(4-hydroxyphenyl)benzoxazole] (2.4556 g, 0.0058 mol), 1,4-bis(4-fluorobenzoyl)benzene (1.8825 g, 0.0058 mol), pulverized anhydrous potassium carbonate (2.1765 g, 0.0157 mol), 30% excess), diphenylsulfone (19.02 g, 19% solids) and toluene (65 ml). The mixture was heated to 140°-150° C. for four hours, and then was heated to 180° C. (one hour), 230° C. (two hours), and 260° C. (one and one-half hours) under nitrogen. The melt was cooled to 200° C., diluted with NMP (20 ml), and precipitated into an acetone/acetic acid mixture. The solid was collected, washed successively in water and methanol and dried at 125° C. to yield a yellow polymer (3.97 g, 97% yield), which showed a $T_m$ at 405° C. and 446° C., and after quenching a $T_g$ of 237° C. The inherent viscosity of a 0.5% solution in concentrated sulfuric acid was 0.40 dl/g.

Polymer characterization for the above Examples and others is presented in Tables 1 and 2 below, and thin film properties for the above Examples and others are presented in Table 3 below.

TABLE 1

POLYMER CHARACTERIZATION

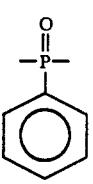

| Ar | $\eta_{inh}$,[1] dL/g | $T_g$,[2] °C. | Wt. loss at 450° C., % | | Temp. of 5% wt. loss, °C.[3] | |
|---|---|---|---|---|---|---|
| | | | air | N$_2$ | air | N$_2$ |
| —SO$_2$— | 0.86 | 285 | 0.78 | 0.71 | 500 | 507 |
| 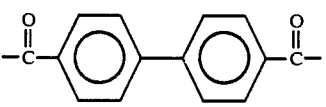 | 0.25 | 260 | 0.94 | 0.54 | 483 | 519 |
|  | 0.72[4] | 257 | 1.34 | 0.49 | 494 | 530 |
| 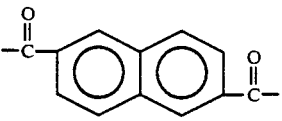 | 0.67[4] | 254 | 0.89 | 0.52 | 499 | 529 |
| 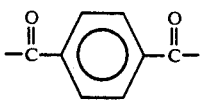 | 0.49 | 253 | 2.13 | 0.79 | 488 | 525 |
|  | 0.92[4] | 249 | 2.13 | 0.68 | 489 | 524 |
| 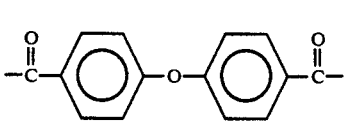 | 0.40 | 227 | 3.13 | 2.06 | 492 | 517 |
|  | 0.62 | 221 | 2.49 | 0.66 | 478 | 528 |
| | 0.41 | 214 | 2.16 | 0.86 | 488 | 526 |

[1] Inherent viscosity measured in DMAc on 0.5% solutions at 25° C.
[2] DSC at a heating rate of 20° C./min
[3] TGA at a heating rate of 2.5° C./min
[4] Inherent viscosity measured in NMP on 0.5% solutions at 25° C.

TABLE 2
POLYMER CHARACTERIZATION

| Ar | $\eta_{inh}$, dL/g[1] | Tg (Tm),[2] °C. | Wt. loss at 450° C., % air | Wt. loss at 450° C., % N$_2$ | Temp. of 5% wt. loss, °C.[3] air | Temp. of 5% wt. loss, °C.[3] N$_2$ |
|---|---|---|---|---|---|---|
|  | 0.50 | 249 (425) | 5.30 | 1.03 | 449 | 505 |
| —SO$_2$— | 0.40 | 247 | 3.45 | 3.60 | 470 | 477 |
| 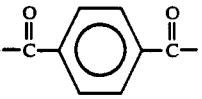 | 0.40 | 237 (405, 446) | 5.53 | 2.56 | 446 | 501 |
|  | 1.04 | 215 (373) | 2.52 | 0.76 | 475 | 530 |

[1] Inherent viscosity measured in H$_2$SO$_4$ on 0.5% solutions at 25° C.
[2] DSC at a heating rate of 20° C./min
[3] TGA at a heating rate of 2.5° C./min

TABLE 3
THIN FILM PROPERTIES (UNORIENTED)

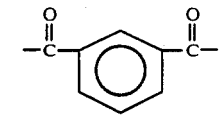

| Ar | $\eta_{inh}$,[1] dL/g | Temp., °C. | Tensile Strength, ksi | Tensile Modulus, ksi | Elong., % |
|---|---|---|---|---|---|
| 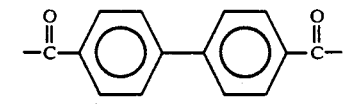 | 0.40 | 25 | 13.5 | 348 | >15* |
|  |  | 93 | 9.4 | 290 | >15* |
|  |  | 150 | 5.5 | 262 | >15* |
| 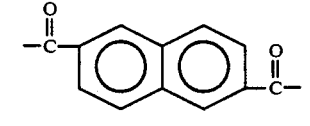 | 0.72[2] | 25 | 13.2 | 268 | >15* |
|  |  | 150 | 6.2 | 217 | >15* |
|  | 0.49 | 25 | 14.8 | 282 | >15* |
|  |  | 93 | 10.1 | 257 | >15* |
|  |  | 150 | 6.5 | 240 | >15* |
|  | 0.92[2] | 25 | 12.7 | 305 | 9.0 |
|  |  | 93 | 7.5 | 235 | >15* |
|  |  | 150 | 4.9 | 209 | >15* |
|  | 0.62 | 25 | 12.3 | 288 | >15* |
|  |  | 93 | 8.5 | 262 | >15* |
|  |  | 150 | 4.9 | 225 | >15* |

TABLE 3-continued

THIN FILM PROPERTIES (UNORIENTED)

| Ar | ηinh,[1] dL/g | Temp., °C. | Tensile Strength, ksi | Tensile Modulus, ksi | Elong., % |
|---|---|---|---|---|---|
|  | 0.67[2] | 25 | 13.0 | 317 | 10.9 |
|  |  | 150 | 5.7 | 232 | >15* |

[1]Inherent viscosity measured in DMAc on 0.5% solutions at 25° C.
[2]Inherent viscosity measured in NMP on 0.5% solutions at 25° C.
*Film specimens not pulled to breaking

We claim:
1. A poly(benzoxazole) having repeating units of the following general structural formula

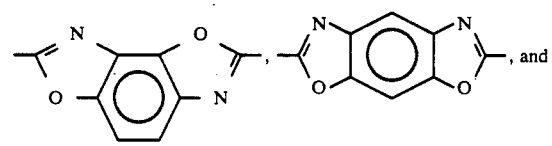

wherein the catenation of oxygen is selected from the group consisting of meta-meta, para-para, and para-meta;
  wherein Ar is a radical selected from the group consisting of

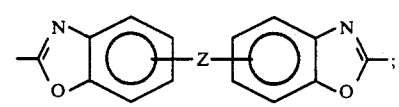

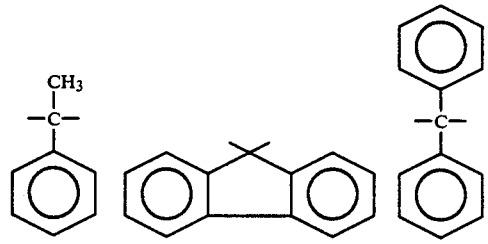

wherein Z is a bond or Z is a radical selected from the group consisting of

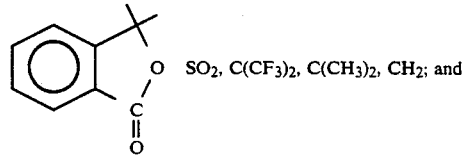

O, SO₂, C(CF₃)₂, C(CH₃)₂, CH₂; and wherein X is a radical selected from the group consisting of $-\overset{O}{\underset{\|}{C}}-$, $-SO_2-$, 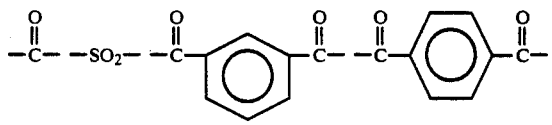

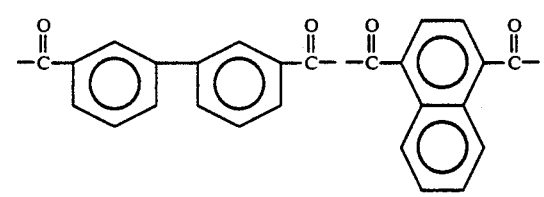

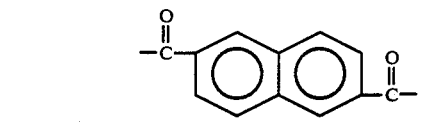

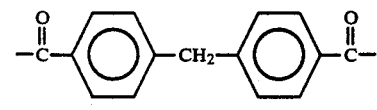

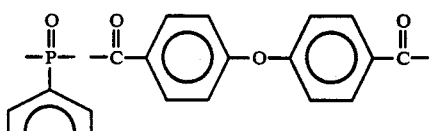

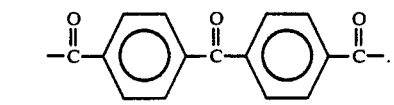

2. The poly(benzoxazole) of claim 1, wherein Ar is

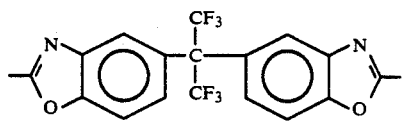
and X is selected from the group consisting of
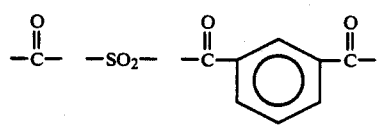
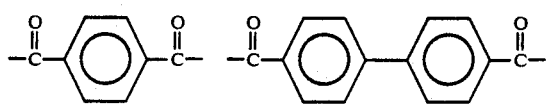
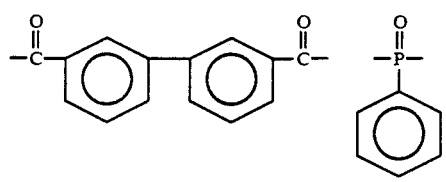
-continued
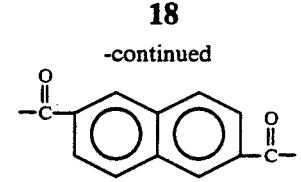
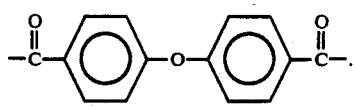
3. The poly(benzoxazole) of claim 1, wherein Ar is
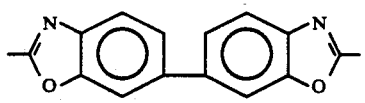
and X is selected from the group consisting of
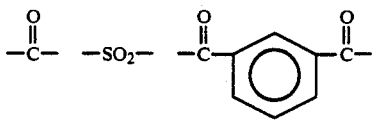
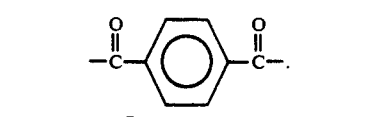
* * * * *